Patented Nov. 1, 1949

2,486,744

UNITED STATES PATENT OFFICE 2,486,744

COMPOSITION OF MATTER

Homer A. Hamm, Chicago, Ill., assignor to Eversharp, Inc., Chicago, Ill., a corporation of Delaware No Drawing. Application January 31, 1947, Serial No. 725,751

6 Claims. (Cl. 260—613)

This invention is based on my discovery of a new composition of matter which I call an hydrindyl-phenoxy-alcohol.

More specifically, the hydrindyl-phenoxy-alcohol embodied by the principles of the present invention has been found to be useful as a solvent and, in particular, as a solvent especially adapted for inks, such as, for example, that type of viscous ink used in conjunction with ball point types of writing or fountain pens, and the provision of such a composition of matter is a principal object of the invention.

Yet more specifically, it is an object of the invention to provide a composition of matter of the type above set forth in which the alcohol is either a substituted or a saturated aliphatic alcohol or one wherein such a composition contains an ether linkage in the chain.

Other objects of the invention will in part be obvious and will in part appear hereinafter.

The invention accordingly comprises a composition of matter possessing the characteristics, properties and the relation of components which will be exemplified in the composition hereinafter described and the scope of the application of which will be indicated in the claims.

The following are specific examples of the new composition: hydrindyl-phenoxy-ethanol; hydrindyl-phenoxy-propanol; hydrindyl-phenoxy-butanol; and hydrindyl-phenoxy-ethoxy-ethanol.

Hydrindyl-phenoxy-ethanol may be prepared, for example, by dissolving hydrindyl-phenol in sodium hydroxide solution and reacting this with ethylene chlorhydrin. The empirical formula may be written $C_{15}H_{14}OC_2H_5OH$.

A preferred method for preparing the compounds claimed is as follows:

These new compounds may be prepared by reacting hydrindyl phenol dissolved in an equi-molecular quantity of sodium hydroxide and adding to it, either in the presence or absence of a solvent such as acetone, benzine or alcohol, a chlorhydrin as, for example, ethylene chlorhydrin or propylene chlorhydrin, heating the reaction mixture under constant stirring to a temperature not below 65° C. and not above 85° C. for a period of one to two hours, adding water to the reaction mixture, separating the oily layer, and dissolving the oily layer in a suitable solvent such as ethyl ether and fractionally distilling it.

Following is a specific example relating to the preparation of hydrindyl-phenoxy-ethanol and hydrindyl-phenoxy-propanol:

|  | Mols |
|---|---|
| Hydrindyl phenol | 0.5 |
| Sodium hydroxide | 0.5 |
| Water | 5 | were mixed together and

| Ethylene chlorhydrin | mol | 0.5 |
|---|---|---|
| Aqueous azeotrope | per cent | 42 | were added. The mixture was heated to 65° C. under constant stirring for two hours. The resulting oily layer was fractionated and 0.2 mol of hydrindyl-phenoxy-ethanol was obtained.

Hydrindyl-phenoxy-propanol may be prepared by substituting propylene chlorhydrin for the ethylene chlorhydrin in the above example. The empirical formula may be written $$C_{15}H_{14}OC_3H_7OH$$

Hydrindyl-phenoxy-butanol may be prepared by substituting butylene chlorhydrin for the ethylene chlorhydrin in the above example. The empirical formula may be written $$C_{15}H_{14}OC_4H_9OH$$

Hydrindyl-phenoxy-ethoxy-ethanol may be prepared by substituting diethylene chlorhydrin for the ethylene chlorhydrin in the above example. The empirical formula may be written $C_{15}H_{14}OC_2H_4OC_2H_4OH$.

In the manufacture of inks, and in particular ball point types of inks, the hydrindyl-phenoxy-alcohol, when used as a solvent, has been found to be especially compatible with all other members of the ink composition including, for example, spirit soluble dyestuffs, diluents, and those ingredients which will provide greater dye solubility for the ink composition with consequent increase in its stability. However, while the new composition has been found to provide enhanced utility in this particular industry it should be understood that it is not intended to limit the scope of the invention thereby but to cover any new use to which the new composition may be applied.

Since certain changes may be made in the above composition of matter and different embodiments of the invention could be made without departure from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

Having described my invention what I claim as new and desire to secure by Letters Patent is:

1. A new composition of matter, which comprises hydrindyl-phenoxy-alcohol.
2. A composition of matter, which comprises hydrindyl-phenoxy-alcohol, in which the alcohol is a saturated aliphatic alcohol.
3. A composition of matter, which comprises hydrindyl-phenoxy-alcohol, in which the alcohol is a saturated aliphatic alcohol containing an ether linkage in the chain.
4. A composition of matter, which comprises an hydrindyl-phenoxy-ethanol.
5. A composition of matter, which comprises an hydrindyl-phenoxy-butanol.
6. A composition of matter, which comprises an hydrindyl-phenoxy-ethoxy-ethanol.

HOMER A. HAMM.

REFERENCES CITED

The following references are of record in the file of this patent:

UNITED STATES PATENTS

| Number | Name | Date |
| --- | --- | --- |
| 2,158,959 | Coleman et al. | May 16, 1939 |
| 2,158,960 | Coleman et al. | May 16, 1939 |
| 2,281,956 | Salzer | May 5, 1942 |
| 2,416,263 | MacMullen | Feb. 18, 1947 |